United States Patent
Yuan et al.

(10) Patent No.: US 12,339,405 B1
(45) Date of Patent: Jun. 24, 2025

(54) LIDAR-CAMERA ONLINE CALIBRATION METHOD AND SYSTEM BASED ON REFLECTANCE MAP

(71) Applicant: SHANDONG UNIVERSITY, Jinan (CN)

(72) Inventors: Hui Yuan, Jinan (CN); Yuanchao Yue, Jinan (CN); Qinglong Miao, Jinan (CN); Hongji Xu, Jinan (CN); Qi Jiang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/808,134

(22) Filed: Aug. 19, 2024

(30) Foreign Application Priority Data

May 22, 2024 (CN) .................. 202410634235.X (51) Int. Cl.
*G01S 7/497* (2006.01)
*G01S 17/89* (2020.01)
(Continued)

(52) U.S. Cl.
CPC .............. *G01S 7/497* (2013.01); *G01S 17/89* (2013.01); *G06T 3/40* (2013.01); *G06T 7/13* (2017.01);
(Continued)

(58) Field of Classification Search
CPC . G01S 7/497; G01S 17/89; G06T 3/40; G06T 7/13; G06T 7/70; G06V 10/44; G06V 10/761
See application file for complete search history.

(56) References Cited

U.S. PATENT DOCUMENTS

| | | | |
|---|---|---|---|
| 11,099,275 B1 | 8/2021 | Zhang et al. | |
| 2008/0046150 A1* | 2/2008 | Breed ................. | B60R 21/0134 701/45 |

(Continued)

FOREIGN PATENT DOCUMENTS

| | | |
|---|---|---|
| CN | 110456330 A | 11/2019 |
| CN | 115909092 A | 4/2023 |

(Continued)

OTHER PUBLICATIONS

Ou, Jinshun, et al., Automatic extrinsic calibration of 3D LiDAR and multi-cameras based on graph optimization Sensors Publication Date: Mar. 13, 2022.

(Continued)

*Primary Examiner* — Isam A Alsomiri
*Assistant Examiner* — Sanjida Naser
(74) *Attorney, Agent, or Firm* — CBM PATENT CONSULTING, LLC (57) ABSTRACT

A laser radar-camera online calibration method and system based on a reflectance map includes: data preprocessing, generating data that meets the input of the neural network part; inputting the preprocessed data into the trained neural network; the neural network will output the edge point features of the reference image and the reflectance map, that is, the reference image and the reflectance map descriptor; by comparing the similarity of the reference image and the reflectance map descriptor, find the matching relationship between the reference image feature and the reflectance map feature point; use the mapping relationship between the reflectance map and the 3D point cloud to find the matching relationship between the reference image and the point cloud; use the EPnP algorithm to estimate the transformation matrix from the given 2D-3D point pair to complete the calibration process.

5 Claims, 3 Drawing Sheets

(51) Int. Cl.
   *G06T 3/40*   (2024.01)
   *G06T 7/13*   (2017.01)
   *G06T 7/70*   (2017.01)
   *G06V 10/44*  (2022.01)
   *G06V 10/74*  (2022.01)

(52) U.S. Cl.
   CPC ............... *G06T 7/70* (2017.01); *G06V 10/44* (2022.01); *G06V 10/761* (2022.01)

(56)  References Cited

U.S. PATENT DOCUMENTS

2022/0214448 A1   7/2022   Li et al.
2023/0245466 A1   8/2023   Park

FOREIGN PATENT DOCUMENTS

| CN | 116229713 A | 6/2023 |
| CN | 117496467 A | 2/2024 |
| WO | 2022141914 A1 | 7/2022 |

OTHER PUBLICATIONS

Wang Shiqiang et al., Research Progress on Fusion Calibration Technology of LiDAR and Camera Infrared and Laser Engineering, vol. 52, Issue 8 Publication Date: Aug. 31, 2023.

\* cited by examiner

LIDAR-CAMERA ONLINE CALIBRATION METHOD AND SYSTEM BASED ON REFLECTANCE MAP

CROSS-REFERENCE TO RELATED APPLICATIONS

This application claims priority to Chinese Patent Application Ser. No. CN202410634235X filed on 22 May 2024.

TECHNICAL FIELD

The present invention relates to a lidar-camera online calibration method and system based on Reflectance Map, belonging to the field of image processing technology.

BACKGROUND TECHNOLOGY

In recent years, the fields of autonomous driving technology and robotics have rapidly developed. Research in autonomous driving continually propels advancements in sensor technology and data fusion. Simultaneously, robotics technology is also evolving, covering various domains from industrial production to personal services. Both autonomous driving and robotics face similar challenges, such as complex and variable environments, perception accuracy, decision-making capabilities, and human-machine interaction. Sensors play a crucial role in both fields.

The perception system in autonomous driving is one of the key technologies to realize autonomous driving capability. It allows vehicles to perceive the surrounding environment, analyze and understand it to make subsequent decisions and plan driving paths. Autonomous vehicles rely on advanced perception systems to obtain accurate and comprehensive information about their surroundings. The research and development of perception systems are essential for the advancement of autonomous driving technology. By continually improving the accuracy, stability, and adaptability of perception systems, safer and more efficient intelligent driving vehicles can be realized, bringing significant potential benefits to society.

As the most reliable data sources in perception systems, sensors enable real-time understanding of road conditions, obstacle locations, and motion states through data fusion at the sensor level and feature level. Different sensors have limitations in detection capabilities and reliability under various environments, and multi-sensor fusion can improve the accuracy of target detection and recognition.

Lidar is widely used in autonomous vehicles, providing practical and precise 3D perception capabilities both day and night. Multi-line lidar forms 3D point cloud data by continuously emitting laser beams and collecting scattered light from targets. Cameras are mainly used for tasks such as target recognition, environmental map construction, lane detection, and target tracking. In recent years, deep learning has shown excellent performance in target recognition and tracking, learning strong feature representations from large datasets, and replacing traditional manual feature design with machine learning methods. The application of binocular and depth cameras has endowed image data with depth information, but there is still room for improvement in precision. By fusing sensors such as lidar and cameras, image data with depth information can be obtained, providing more accurate and comprehensive environmental perception capabilities for autonomous systems.

Multi-sensor calibration is divided into intrinsic calibration and extrinsic calibration. Intrinsic calibration determines the internal mapping relationships of sensors, such as the focal length of the camera, principal point coordinates, and pixel spacing. Extrinsic calibration defines the relative positions and orientations between multiple sensors. Most intrinsic parameters are provided or calculated by manufacturers, so the calibration work mainly focuses on determining the extrinsic parameters. By precisely calibrating the position and pose relationships of sensors, data from different sensors can be converted into a unified reference system, achieving accurate data transformation between coordinate systems, such as from world coordinates to camera coordinates. This improves the accuracy of object detection and tracking, and enhances the reliability of environmental perception and map construction. Therefore, the accuracy and stability of extrinsic calibration are crucial for the successful application of autonomous driving technology. Inspired by the significant success of data fusion, various types of sensors have also rapidly developed over the past decades, mainly for purposes such as detection, segmentation, and recognition.

Currently, many online calibration methods based on deep learning have emerged. The usual process is to first calibrate the sensors and then apply them in practical use. However, during the operation of robots or autonomous vehicles, sensor poses may drift, causing errors in calibration parameters and leading to unreliable fusion data, which can pose safety risks. Most current online calibration methods based on deep learning extract features from input images and point clouds (or depth map), and then input these features into multilayer perceptrons (MLP) to predict external parameters. However, most of these methods are only suitable for correcting small errors in external parameters. Of course, there are some methods that simulate situations with unknown external parameters by providing large parameter errors. Although these methods have a wider application range, they may result in lower final registration accuracy.

Due to the inherent cross-dimensional differences between 2D images captured by vehicle-mounted cameras and 3D point clouds captured by lidar, most deep learning-based methods extract high-dimensional features of data from different dimensions and find 2D-3D matching point pairs based on feature similarity in high-dimensional space. Subsequently, methods such as EPnP (detailed in the paper "EPnP: Efficient Perspective-n-Point Camera Pose Estimation") are used to estimate the corresponding pose, that is, the transformation matrix between the lidar coordinate system and the camera coordinate system. Cross-dimensional differences between high-dimensional features extracted by deep learning feature extractors remain a challenge, severely limiting the accuracy of algorithms. To address this issue, it is usually necessary to add neural network modules to reduce cross-dimensional differences, which undoubtedly increases computational complexity.

SUMMARY OF THE INVENTION

To address the shortcomings of existing technologies, the objective of the present invention is to provide a lidar-camera online calibration method based on edge information from Reflectance Map. By utilizing the reflectance information of lidar point clouds to project the point cloud into a reflectance map, the task of registering the image obtained by the camera (hereinafter referred to as the reference image) with the lidar point cloud is transformed into a task of matching feature points between 2D images. Through the mapping relationship between the reflectance map and the point cloud, the matching relationship between the image and the 3D points is found, thereby completing the registration of the image and the lidar point cloud. Ultimately, the extrinsic calibration of the camera and lidar in systems such as autonomous driving is accomplished.

The present invention mainly achieves 2D-3D registration through the reflectance of images and lidar point clouds. This method innovatively applies techniques such as point cloud reflectance map projection, wavelet transform-based image denoising algorithms, and ResNet neural networks. The algorithm framework proposed by the present invention is specially designed to handle situations with unknown external parameters, aiming to improve the online calibration accuracy in such cases. The invention proposes an online calibration algorithm based on the edges of the reflectance map projected from the lidar point cloud. This method not only eliminates cross-dimensional differences but also significantly reduces computational complexity and improves calibration accuracy.

The present invention also provides a lidar-camera online calibration system based on Reflectance Map. Terminology Explanation:

1, RNet (Residual Network): RNet, or Residual Network, is a deep neural network architecture that introduces structures known as residual blocks to address common issues encountered in traditional deep networks, such as vanishing gradients, exploding gradients, and the increased difficulty of training as network depth increases. The core idea of RNet is to use shortcut connections, also called skip connections, which allow some input to bypass certain layers and directly pass to subsequent layers. This design helps maintain the flow of information and prevents performance degradation as the network depth increases. When the neural network input is x, the goal is to learn a mapping function $H(x)$ that map the input x to the desired output y. In traditional neural networks, each layer attempts to learn this mapping function $H(x)$. In ResNet, however, the concept of residual learning is introduced. The key idea of residual learning is to learn the residual $F(x)=H(x)-x$ rather than directly learning the complete mapping $H(x)$. This means learning the difference between the input xxx and the target output $H(x)$ rather than the direct mapping from xxx to $H(x)$. Shortcut connections allow the input xxx to be directly added to the deeper layer's output, typically achieved through identity mapping. This design helps gradients propagate directly through these connections, effectively alleviating the vanishing gradient problem and stabilizing the training of deep networks.

2, Wavelet Transform (WT): The Wavelet Transform is a signal processing technique used to analyze the frequency components and time-domain characteristics of signals. It decomposes a signal into different scales and frequencies using wavelet functions, providing both time-domain and frequency-domain information simultaneously. Unlike Fourier Transform, which uses sine and cosine waves as basis functions, Wavelet Transform uses a set of basis functions called "wavelets." The wavelet coefficients generated by the Wavelet Transform represent the signal's energy distribution at different scales and frequencies. Each wavelet basis function has different scale and frequency characteristics, capturing the signal's variations at different scales and frequencies. The flexibility of Wavelet Transform in choosing the transformation radius allows for selecting multi-band wavelets, wavelet packets, or translation-invariant wavelets based on the signal characteristics and denoising requirements. Different mother wavelets can be chosen to achieve the best processing results in various applications.

3, RNet34 Encoder: RNet34 is a specific architecture within the ResNet family, consisting of 34 convolutional layers. In deep learning, an encoder is responsible for converting input data (such as images) into high-dimensional feature representations. In RNet34, the encoder part comprises a network of convolutional and pooling layers designed to extract abstract features from the input data.

4, RNet34 Decoder: Corresponding to the encoder, the decoder is responsible for mapping the high-dimensional features extracted by the encoder back to the original input space, generating the corresponding output results. In the RNet34 decoder, upsampling operations are used to restore the low-resolution feature map to the original input size or to obtain high-resolution feature map.

5, Bilinear Interpolation: Bilinear interpolation is a common image interpolation method used to estimate the values between discrete pixel grids. In bilinear interpolation, the value at a target location is estimated by considering the values of the four nearest pixels and their relative positions. Specifically, bilinear interpolation first determines the four nearest pixels around the target location based on its coordinates in the original image. Then, it calculates the target location's pixel value by weighted averaging these four pixel values according to their relative position to the target location. The weights for this averaging are determined by the distance relationship between the target location and the four nearest pixels.

To achieve the aforementioned objectives, the present invention provides the following technical solution:

A LiDAR-camera online calibration method based on Reflectance Map, comprising:

Data preprocessing to generate input data for the neural network, including the reference image, reflectance map, and the projection mapping relationship between the point cloud and the reflectance map;

Inputting the preprocessed data into a trained neural network, where the neural network outputs the edge point features of the reference image and the reflectance map, i.e., the descriptors of the reference image and the reflectance map. By comparing the similarity of the descriptors, the matching relationship between the reference image features and the reflectance map features is found;

Using the mapping relationship between the reflectance map and the 3D point cloud to find the matching relationship between the reference image and the point cloud;

Using the EPnP algorithm to estimate the transformation matrix from the given 2D-3D point pairs, completing the calibration process.

The input data for the neural network includes the reference image, the reflectance map projected based on laser projection, and the projection mapping relationship between the LiDAR point cloud and the reflectance map. The reference image is obtained by adjusting the camera-captured image to a specified size, the reflectance map is obtained by projecting the LiDAR point cloud through the laser projection, and the projection mapping relationship is obtained by generating a mapping matrix during the projection process.

Using a laser-based projection method, the reflectance of the point cloud is projected to obtain the reflectance map, including:
  Using the spherical projection principle to convert the coordinates of the point cloud from Cartesian coordinates to spherical coordinates;
  Obtaining the laser projection of the point cloud;
  Generating the projection map and recording the mapping. While generating the reflectance map, a mapping matrix between the 3D point cloud and the reflectance map is recorded, which contains values corresponding to the indices of points in the original point cloud that fall on the pixels of the reflectance map.
Acquiring the preprocessed grayscale image, including:
  Adjusting the camera image to the same size and obtaining the adjusted grayscale image through preprocessing, which, along with the reflectance map obtained from the point cloud projection, is input into the neural network.

The neural network includes an image feature extraction network and a matching optimization network. Two image feature extraction networks extract feature information from the edge points of the reference image and the reflectance map, respectively, and input this information into the matching optimization network to find the optimal 2D-2D matching point pairs based on the similarity of the descriptors.

Before extracting features through the image feature extraction network, image edge point extraction is performed, including:
  Using the Sobel edge detection method to extract the edge points of the reflectance map;
  Applying wavelet transform to decompose the reflectance map, obtaining wavelet low-frequency and high-frequency coefficients, filtering out high-frequency noise, and restoring the reflectance map to obtain a denoised image. This operation is known as wavelet filtering. After wavelet filtering, using the Sobel operator to extract the edge points of the reflectance map;
  Using the Sobel operator to extract the edge points of the reference image;
  Extracting image features using the RNet34 network.

The RNet34 network includes a RNet34 encoder and a RNet34 decoder. The reference image and the reflectance map are input into the RNet34 encoder to generate global features for both the reference image and the reflectance map. The global features of the reference image are input into the RNet34 decoder to output the reference image features. The global features of the reflectance map are input into the RNet34 decoder to output the reflectance map features. The reference image features and the global features of the reflectance map are concatenated to generate concatenated features for the reference image. The reflectance map features and the global features of the reference image are concatenated to generate concatenated features for the reflectance map. The concatenated features of the reference image are aggregated to the extracted edge points of the reference image using bilinear interpolation to obtain the edge point features. The concatenated features of the reflectance map are aggregated to the extracted edge points of the reflectance map using bilinear interpolation to obtain the edge point features.

Inputting the matching optimization network to find the optimal 2D-2D matching point pairs based on the similarity of the descriptors from the reference image and the reflectance map, including:
  The edge point features of the reference image and the reflectance map are first passed through a linear layer, then multiplied to obtain a similarity matrix S. Softmax calculations are performed twice on this similarity matrix S along rows and columns to obtain two matrices, which are then used to calculate their Hadamard product to get a new matrix after Softmax processing. Simultaneously, the edge point features of the reference image are passed through a linear layer and a Sigmoid activation function to obtain the matching score $\sigma_R$ of the reference image. The edge point features of the reflectance map are passed through a linear layer and a Sigmoid activation function to obtain the matching score $\sigma_I$ of the reflectance map. The matching scores $\sigma_R$ and $\sigma_I$ of the reference image and the reflectance map are multiplied by the new matrix after Softmax processing to obtain the partial allocation matrix P.

For the partial allocation matrix P, the maximum value of each row is identified and recorded. If the column coordinate of these maximum values is also the maximum value in its column, the corresponding 2D point at that position is considered an optimal 2D-2D matching point pair.

According to the preferred embodiment of the present invention, the overall loss function L of the neural network is:

$$L = L_\sigma + L_P;$$

After projecting the 3D point cloud onto the 2D image plane, a circular radius threshold $\epsilon_c$ is set. If the Euclidean distance between the projection point of a 3D feature point and a certain 2D feature point is less than $\epsilon_c$, they are considered an actual 2D-3D matching point pair. After obtaining the matching point pairs, the matching status of the 2D and 3D points is recorded as $\sigma_{R_{GT}}$ and $\sigma_{I_{GT}}$. The binary cross-entropy loss functions for the matching scores $\sigma_R$ and $\sigma_I$ and the actual matching are calculated separately, resulting in $L_{\sigma 1}$ and $L_{\sigma 2}$, as follows:

$$L_{\sigma 1} = -\left(\sigma_{R_{GT}} \cdot \log(\sigma_R) + \left(1 - \sigma_{R_{GT}}\right) \cdot \log(1 - \sigma_R)\right),$$

$$L_{\sigma 2} = -\left(\sigma_{I_{GT}} \cdot \log(\sigma_I) + \left(1 - \sigma_{I_{GT}}\right) \cdot \log(1 - \sigma_I)\right),$$

$$L_\sigma = L_{\sigma 1} + L_{\sigma 2};$$

$$L_P = -\frac{1}{M} \sum_{(i,j) \in M} \log P_{ij},$$

Here, M represents the positions of the actual matching point pairs, and $P_{ij}$ is the value in the i-th row and j-th column of the partial assignment matrix P. (i,j) are the point pairs in the actual matching set M, where i is the index of the feature point in the reference image and j is the index of the corresponding feature point in the reflectance map.

According to the preferred embodiment of the present invention, by utilizing the mapping relationship between the reflectance map and the 3D point cloud, the matching relationship between the reference image and the point cloud is determined; including:
  While projecting the reflectance of the point cloud to obtain the reflectance map, the mapping matrix between the 3D point cloud and the reflectance map must also be recorded. Using this mapping matrix, find the 3D points in the original point cloud corresponding to the edge points of the reflectance map in the 2D-2D matched pairs obtained using the partial assignment matrix P, thereby transforming the 2D-2D correspondence into 2D-3D correspondence.

According to the preferred embodiment of the present invention, the EPnP algorithm is used to estimate the transformation matrix from the given 2D-3D point pairs to complete the calibration process; including:

After obtaining the 2D-3D correspondence pairs, use the EPnP algorithm with RANSAC to estimate the camera pose, where the pose includes the rotation matrix R and the translation matrix T; completing the calibration process.

Further preferred is to use the EPnP algorithm with RANSAC to estimate the camera pose; including:

For a set of 2D image points $u_i$ and corresponding 3D space points $X_i$, where i=1, 2, . . . , N; optimize the camera pose by minimizing the reprojection error; project the 3D space points $X_i$ into the camera coordinate system and compare them with the corresponding 2D image points $u_i$;

The reprojection error is defined as the Euclidean distance between the projected point xi in the camera coordinate system and the corresponding 2D image point $u_i$;

Adjust the camera pose to minimize the reprojection error;

Finally, provide the estimated camera pose, namely the rotation matrix R and the translation matrix T.

A computing device, including a memory and a processor, where the memory stores a computer program, and the processor, when executing the computer program, implements the steps of the reflectance map-based deep learning-assisted online calibration method.

A computer-readable storage medium storing a computer program, which, when executed by a processor, implements the steps of the reflectance map-based deep learning-assisted online calibration method.

A reflectance map-based LiDAR-camera online calibration system, including:

Data preprocessing module, configured to: preprocess data to generate inputs suitable for the neural network part, including the reference image, reflectance map, and the projection mapping relationship between the point cloud and the reflectance map;

Matching relationship acquisition module, configured to: input the preprocessed data into a trained neural network; the neural network outputs the edge point features of the reference image and the reflectance map, i.e., descriptors of the reference image and the reflectance map; find the matching relationship between features of the reference image and the reflectance map by comparing the similarity of these descriptors; use the mapping relationship between the reflectance map and the 3D point cloud to find the matching relationship between the reference image and the point cloud;

Calibration implementation module, is configured to: use the EPnP algorithm to estimate the transformation matrix from the given 2D-3D point pairs to complete the calibration process.

The beneficial effects of the present invention are:

1. The present invention redefines the 2D-3D registration task as a 2D-2D task using the LiDAR reflectance map, eliminating the modality differences between images and point clouds, and reducing task complexity. The designed extraction network and registration network structure improve calibration accuracy and computational efficiency.

2. The present invention uses a LiDAR point cloud spherical projection method based on laser projection, avoiding projection deviations caused by point cloud position deviations due to LiDAR sensor jitter, without the need for interpolation to complete the projection map, and capable of detecting significant edge points. Meanwhile, using reflectance information projection more effectively reduces cross-modality differences.

3. The network designed by the present invention uses an improved Sobel operator for image edge point detection, a ResNet-based feature extraction network, and a specific point matching optimization layer to ensure feature point significance. The two types of image features extracted by the network exchange information within the network, further reducing modality differences and improving matching accuracy.

DETAILED DESCRIPTION OF INVENTION

The following will further describe the present invention in detail in conjunction with the accompanying drawings and embodiments, but are not limited to this.

Example 1

Figure 1:
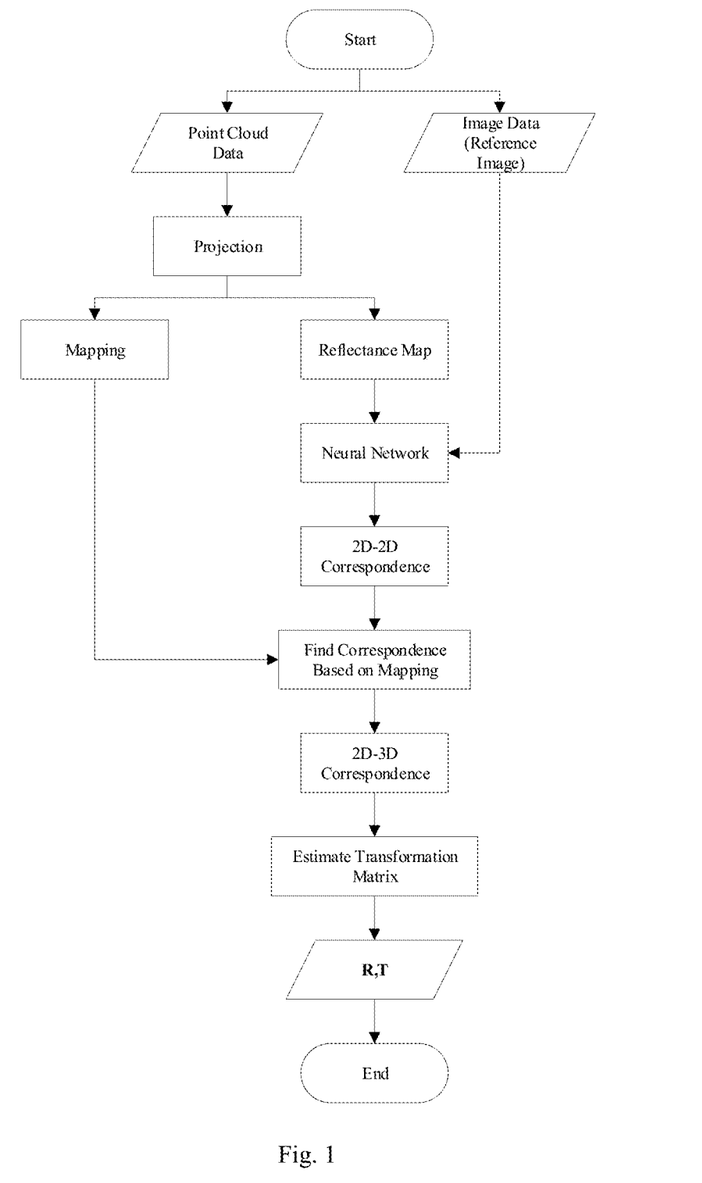
FIG. 1 is a schematic diagram of the overall process of the reflectance map-based deep learning-assisted online calibration method of the present invention.

A reflectance map-based LiDAR-camera online calibration method, as shown in FIG. 1, includes:

Data preprocessing to generate data that meets the input requirements of the neural network part, including the reference image, reflectance map, and the projection mapping relationship between the point cloud and the reflectance map;

Inputting the preprocessed data into a trained neural network constructed with Python language; the neural network outputs the edge point features of the reference image and the reflectance map, i.e., descriptors of the reference image and the reflectance map; finding the matching relationship between the reference image features and the reflectance map features by comparing the similarity of these descriptors;

Using the mapping relationship between the reflectance map and the 3D point cloud to find the matching relationship between the reference image and the point cloud;

Using the EPnP algorithm to estimate the transformation matrix from the given 2D-3D point pairs to complete the calibration process.

Example 2

Based on the reflectance map-based LiDAR-camera online calibration method described in Example 1, the difference lies in:

The data that meets the input requirements of the neural network part includes the reference image, the reflectance map projected based on laser projection, and the projection mapping relationship between the LiDAR point cloud and the reflectance map during the projection process. The reference image is obtained by adjusting the camera image to a specified size through operations such as cropping and scaling. The reflectance map is obtained by projecting the LiDAR point cloud through laser projection. The projection mapping relationship between the LiDAR point cloud and the reflectance map is obtained by generating a mapping matrix through the projection process.

In the field of autonomous driving, commonly used LiDAR systems typically adopt a multi-line rotating scanning design. The performance of LiDAR is closely related to the number of beams; more beams mean better object detection performance. The number of beams is usually represented by the number of laser heads, including different specifications such as 16-line, 32-line, 64-line, and 128-line. The working principle is to collect data of the surrounding environment through the rotation of the laser head within a 3600 range. For example, a 64-line LiDAR will generate 64 circles of point cloud data, which are stored sequentially from top to bottom. Therefore, based on this storage characteristic of the point cloud, it can be divided into 64 rows, where the number of each row is the laser projection of that row of point clouds.

Traditional FOV spherical projection methods based on point cloud depth will cause the problem of thread misalignment during the projection process, i.e., the point cloud data of two adjacent lines are too close in the z-axis direction, leading to one line of point cloud data being covered during projection while another line's data is missing. This will result in holes in the projection map, which need to be completed through interpolation. In contrast, the projection method based on laser projection can effectively eliminate point cloud position deviations caused by LiDAR sensor jitter, thereby eliminating the need for interpolation completion and improving the accuracy and precision of the projection map. Meanwhile, in terms of imaging principles, reflectance information is closer to the image data obtained by the camera than point cloud depth information. Using the laser-based projection method, project the reflectance of the point cloud to obtain the reflectance map; including:

Using the spherical projection principle to perform coordinate transformation on the point cloud, converting the point cloud from the Cartesian coordinate system to the spherical coordinate system; calculating the azimuth angle φ based on the (x, y, z) coordinates of the point cloud. The calculation formula for the azimuth angle φ is φ=arctan 2(y, x), and the value range of the azimuth angle φ is [−π, π].

Obtain the laser projection of the point cloud; since the storage of point cloud information varies among different types of LiDARs, the laser projection information can be directly used if it is included in the point cloud data. If the laser projection information is not included, it can be calculated based on the pattern in the sequential storage format of the LiDAR point cloud during scanning. Specifically, the azimuth angle φ values of points in the same laser will form a cycle from −π to π from the first point to the last point. Whenever the LiDAR scan ends, the azimuth angle φ will jump from its maximum value π to its minimum value −π. This property can be used to calculate the laser projection information of the point cloud.

Figure 2:
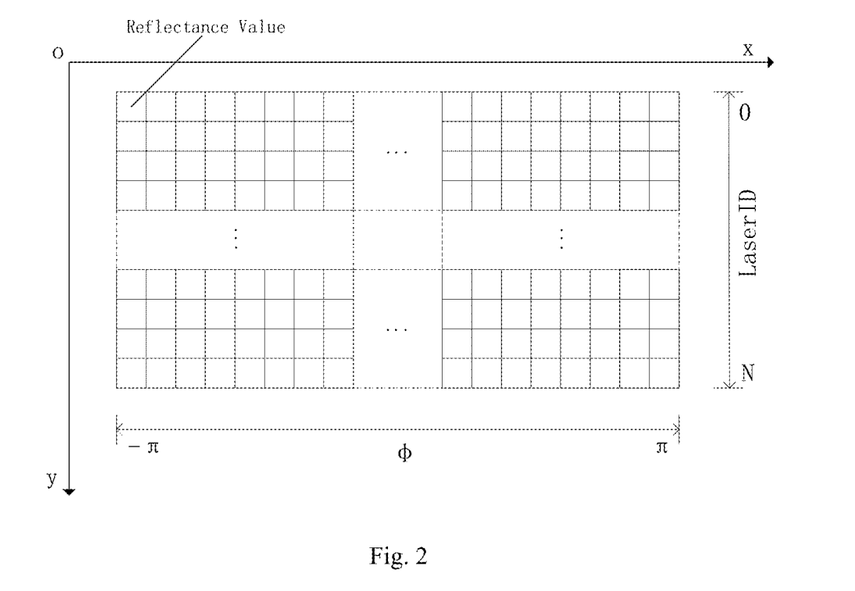
FIG. 2 is a schematic diagram of the reflectance map based on laser projection projection of the present invention.

Generate the projection map and record the mapping; after obtaining the laser projection and azimuth angle φ of the point cloud in the previous steps, the pixel coordinates [u,v] of the point cloud corresponding to the projection image can be obtained as follows: Taking a 64-line LiDAR as an example, assuming the projection image resolution is set to 64×1024, the projection coordinate in the height direction uses laser projection as the point's projection coordinate, i.e., u=laser projection. The width direction is projected proportionally according to the 1024 resolution, with the calculation formula being $$v = \frac{\varphi + \pi}{2\pi} \times 1024.$$

Therefore, the pixel coordinates of the point cloud corresponding to the projection image are $$\left[LaserID, \frac{\varphi + \pi}{2\pi} \times 1024\right].$$

Figure 3:
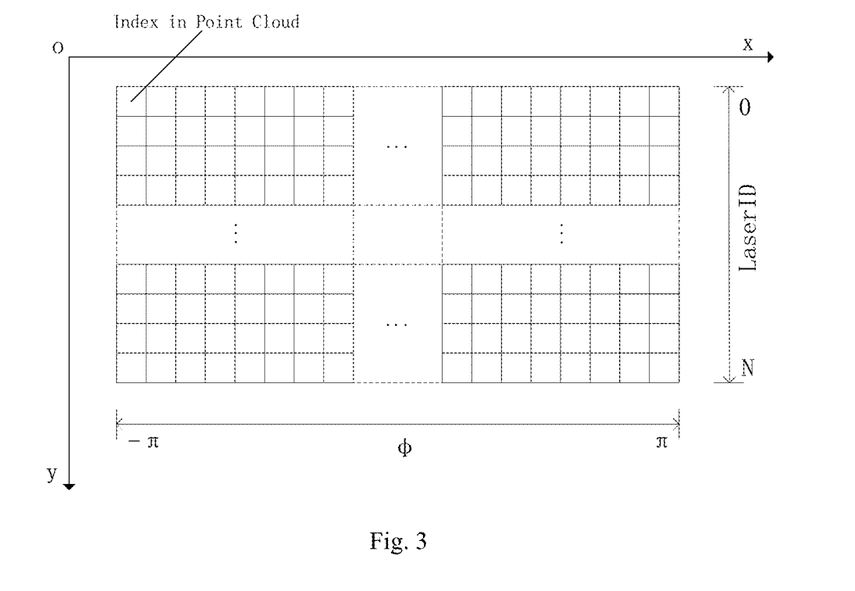
FIG. 3 is a schematic diagram of the mapping matrix between the 3D point cloud and the reflectance map of the present invention.

The composition of the reflectance map obtained through projection is shown in FIG. 2, where the grayscale value of each pixel represents the reflectance of the point cloud falling on that pixel. While generating the reflectance map, a mapping matrix between the 3D point cloud and the reflectance map is recorded. This involves generating a matrix with rows and columns consistent with the image matrix of the reflectance map, where the value of the matrix is the index of the point in the original point cloud corresponding to the pixel on the reflectance map. The composition of the matrix is shown in FIG. 3, where the rows and columns of the mapping matrix are consistent with the image matrix of the reflectance map, but the information stored in the matrix is the index of the point in the point cloud. Using this index, the specific point in the 3D point cloud corresponding to the 2D pixel coordinates can be traced back.

If this projection method is used for point cloud data without reflectance information, depth information can be used instead to obtain a depth map for subsequent computations. The depth information, which is the radius r, in the spherical coordinate system, can be calculated using $r=\sqrt{x^2+y^2+z^2}$. The projection method remains the same, and the pixel grayscale value of the depth map represents the depth of the point cloud falling on that pixel instead of the reflectance.

Obtaining the preprocessed grayscale image; includes:
Adjusting the camera-captured image to the same size to fit the network's input requirements through operations such as cropping and scaling; obtaining the adjusted grayscale image through the preprocessing process, and inputting it together with the reflectance map obtained from the point cloud projection into the neural network for subsequent computations.

The neural network includes an image feature extraction network and a matching optimization network; extracting feature information from the edge points of the reference image and the reflectance map through the two image feature extraction networks respectively, and inputting them into the matching optimization network to find the optimal 2D-2D matching point pairs based on the similarity of the descriptors of the reference image and the reflectance map.

Figure 4:
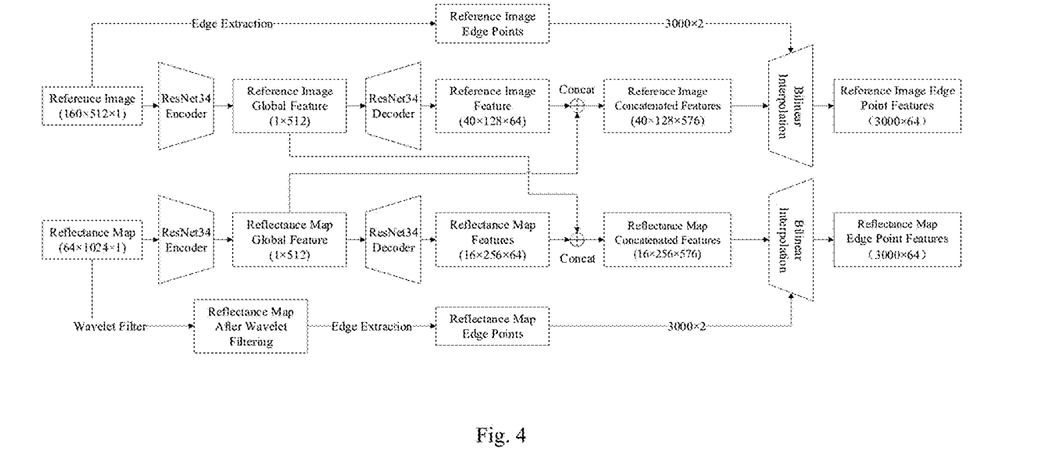
FIG. 4 is a schematic diagram of the image feature extraction network of the present invention.

Before extracting features through the image feature extraction network, edge points of the image are extracted; including:

As shown in FIG. 4, before inputting the image into the feature extractor, edge points of the image need to be extracted. There are many methods for extracting edge points for grayscale images, including common methods such as gradient-based techniques like the Sobel operator and the Canny edge detection algorithm. Due to the significant noise in the actual generated Reflectance Map, an improved Sobel edge detection method (detailed in the paper "An Improved Sobel Edge Detection") is used in this invention to extract edge points from the reflectance map, reducing the impact of noise.

Using the improved Sobel edge detection method (detailed in the paper "An Improved Sobel Edge Detection") to extract edge points from the reflectance map; decomposing the reflectance map using wavelet transform to obtain wavelet low-frequency and high-frequency coefficients, filtering out high-frequency noise, and reconstructing the reflectance map to obtain a wavelet-denoised enhanced image. This operation is called wavelet filtering. After wavelet filtering, using the Sobel operator to extract 3,000 edge points from the reflectance map;

Using the Sobel operator to extract 3,000 edge points from the reference image; for the reference image, edge extraction is performed directly without wavelet filtering.

Extracting features from the image using the RNet34 network, as shown in FIG. 4. The RNet34 network includes a RNet34 encoder and a RNet34 decoder; inputting the obtained reference image (e.g., with a size of 160×512×1) and the reflectance map (e.g., with a size of 64×1024×1) into the RNet34 encoder, generating global features with dimensions 1×512 (representing a feature scale of 1 and 512 channels) for both the reference image and the reflectance map;

Inputting the global features of the reference image into the RNet34 decoder to output image features with dimensions 40×128×64 (representing a feature scale of 40×128 and 64 channels); inputting the global features of the reflectance map into the RNet34 decoder to output image features with dimensions 16×256×64 for the reflectance map;

Concatenating the reference image global features and the reflectance map image features to generate combined features for the reference image; concatenating the reflectance map global features and the reference image features to generate combined features for the reflectance map; specifically, for the 512-channel global features, using the concatenation (Concatenate) operation to concatenate them to the end of the decoder-generated features, so that the two types of feature information can be shared. For the reference image, this generates combined features with dimensions 40×128×576 (512+64). The same operation is performed for the reflectance map global features, generating reflectance map features with dimensions 16×256×64 and combined features with dimensions 16×256×576 (512+64).

The obtained concatenated features of the reference image are aggregated to the extracted reference image edge points (size 3000×2). Using bilinear interpolation, the reference image edge point features (3000×2) are obtained. Similarly, the concatenated features of the reflectance map are aggregated to the extracted reflectance map edge points (size 3000×2), and using bilinear interpolation, the reflectance map edge point features are obtained.

Figure 5:
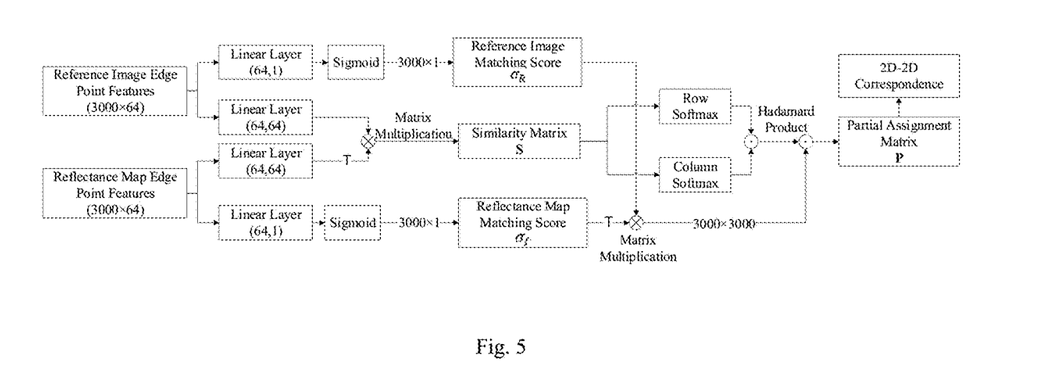
FIG. 5 is a schematic diagram of the matching optimization network of the present invention.

These features are then input into the matching optimization network to find the optimal 2D-2D matching point pairs based on the similarity of the descriptors of the reference image and the reflectance map. The process includes:

After obtaining the 2D and 3D feature descriptors, the similarity of the descriptors is used to predict the matching pairs of feature points. Therefore, a matching optimization network is used, similar to the method described in the paper "LightGlue: Local Feature Matching at Light Speed".

First, the edge point features of the reference image and the reflectance map are passed through linear layers with both input and output channels set to 64. The resulting features are then multiplied to obtain a similarity matrix S. This similarity matrix S undergoes two Softmax calculations along the rows and columns. The resulting matrices are multiplied element-wise (Hadamard product) to obtain a new matrix after Softmax processing.

At the same time, the reference image edge point features are passed through a linear layer with an output dimension of 1 and a Sigmoid activation function to obtain the reference image matching score $\sigma_R$ (size 3000×1). The reflectance map edge point features are similarly processed through a linear layer with an output dimension of 1 and a Sigmoid activation function to obtain the reflectance map matching score $\sigma_I$ (size 3000×1). The reference image matching score $\sigma_R$ and the reflectance map matching score $\sigma_I$ are multiplied together and then multiplied element-wise with the new matrix obtained after Softmax processing to obtain the partial assignment matrix P.

For the partial assignment matrix P, the maximum value of each row is found and recorded. If the column coordinates of these maximum values are also the maximum values in their respective columns, the corresponding 2D points are identified as optimal 2D-2D matching point pairs.

The overall loss function L of the neural network is:

$$L = L_o + L_P;$$

The loss function in the neural network training part of this invention consists of $L_O$ and $L_P$ components. During the loss function calculation phase, the 3D feature points are projected onto the camera plane according to the actual transformation matrix and camera intrinsic parameters, resulting in the projection points of the 3D feature points.

A circular radius threshold $\epsilon_c$ is set after projecting the 3D point cloud onto the 2D image plane. If the Euclidean distance between a 3D feature point's projection and a 2D feature point is less than $\epsilon_c$ (usually an integer between 1 and 5), they are considered as actual 2D-3D matching point pairs. After obtaining the matching point pairs, record whether the 2D and 3D points match as $\sigma_{R_{GT}}$ and $\sigma_{I_{GT}}$.

$\sigma_{R_{GT}}$ is the ground truth matching score for the reference image. If the Euclidean distance between the projected point of the 3D point cloud onto the 2D image plane and the 2D point in the reference image is less than the threshold $\epsilon_c$, they are considered an actual matching point pair. The situation where a 2D feature point in the reference image is selected as a matching point is recorded in $\sigma_{R_{GT}}$. If a 2D feature point is determined to be a matching point, the corresponding value in $\sigma_{R_{GT}}$ is set to 1; otherwise, it is set to 0.

$\sigma_{I_{GT}}$ is the ground truth matching score for the reflectance map. If the Euclidean distance between the projected point of the 3D point cloud onto the 2D image plane and the 2D point in the reference image is less than the threshold $\epsilon_c$, they are considered an actual matching point pair. The situation where a 3D feature point corresponding to the reflectance map is selected as a matching point is recorded in $\sigma_{I_{GT}}$. If a 3D feature point in the reflectance map corresponding to a 3D point in the point cloud is determined to be a matching point, the corresponding value in $\sigma_{I_{GT}}$ is set to 1; otherwise, it is set to 0.

Calculate the binary cross-entropy loss for the matching scores $\sigma_R$ and $\sigma_I$ and the actual matches to get $L_{o1}$ and $L_{o2}$:

$$L_{o1} = -(\sigma_{R_{GT}} \cdot \log(\sigma_R) + (1 - \sigma_{R_{GT}}) \cdot \log(1 - \sigma_R)),$$

$$L_{o2} = -(\sigma_{I_{GT}} \cdot \log(\sigma_I) + (1 - \sigma_{I_{GT}}) \cdot \log(1 - \sigma_I))$$

The sum of these losses gives $L_o = L_{o1} + L_{o2}$.

For the partial assignment matrix P, the 2D points and 3D points corresponding to the maximum values in each row and column are identified as predicted 2D-3D matching point pairs. After obtaining the actual 2D-3D matching point pairs, the values corresponding to the matching positions in the partial assignment matrix P should be larger. Thus, $L_P$ is given by:

$$L_P = -\frac{1}{M} \sum_{(i,j) \in M} \log P_{ij}$$

That is, taking the logarithm of all the values of the actual matching point pairs M in the partial assignment matrix P, summing them up, averaging them, and then taking the negative. Here, M represents the positions of the actual matching point pairs, and $P_{ij}$ is the value in the i-th row and j-th column of the partial assignment matrix P. (i,j) are the point pairs in the actual matching set M, where i is the index of the feature point in the reference image and j is the index of the corresponding feature point in the reflectance map.

Using the reflectance map and the mapping relationship between the 3D point cloud and the reflectance map, match the reference image with the point cloud. This includes:

While projecting the reflectance of the point cloud to obtain the reflectance map, the mapping matrix between the 3D point cloud and the reflectance map, as shown in FIG. 3, is recorded. Using this mapping matrix, find the original 3D points in the point cloud corresponding to the edge points of the reflectance map in the 2D-2D matching point pairs obtained from the partial assignment matrix P, thus transforming the 2D-2D matching relationship into a 2D-3D matching relationship.

Using the EPnP algorithm with RANSAC to estimate the transformation matrix from the given 2D-3D point pairs to complete the calibration process. This includes:

After obtaining the 2D-3D matching pairs, use the EPnP algorithm with RANSAC (as described in the paper "Random sample consensus: a paradigm for model fitting with applications to image analysis and automated cartography") to estimate the camera pose, including the rotation matrix R and the translation matrix T. The EPnP algorithm optimizes the camera position and orientation by solving a nonlinear optimization problem, primarily by minimizing the reprojection error. RANSAC enhances the robustness of the EPnP algorithm by effectively removing outliers and noise through random sampling and model fitting, ensuring the accuracy of the camera pose. Combining the EPnP algorithm with RANSAC reliably estimates the transformation matrix from the LiDAR coordinate system to the camera coordinate system, obtaining the rotation matrix R and translation matrix T, and completing the online calibration process between the camera and LiDAR.

The EPnP algorithm process includes:

For a set of 2D image points $u_i$ and corresponding 3D space points $X_i$ where i=1, 2, ..., N, the EPnP algorithm optimizes the camera pose by minimizing the reprojection error. The reprojection error is defined as the Euclidean distance between the projected 3D points $X_i$ in the camera coordinate system and the corresponding 2D image points $u_i$. For each 3D point $X_i$, its projection xi in the camera coordinate system is calculated using the camera intrinsics K and the extrinsics R and T:

$$x_i = K(RX_i + T)$$

The reprojection error is minimized by iteratively adjusting the camera pose until the optimal solution is reached.

Finally, the estimated camera pose, including the rotation matrix R and translation matrix T, is obtained, thus achieving the camera pose estimation from the given 2D-3D point pairs.

This embodiment was trained and tested on the KITTI Odometry dataset (as described in the paper "Are we ready for autonomous driving? The KITTI vision benchmark suite"). The model uses 2D/3D sensor data pairs from the same frame. For the KITTI dataset, the training was done using sequences 0-8, and testing was done using sequences 9-10. During training and testing, artificial errors were applied to the point cloud, including 2D translations within ±10m along the x and y axes and arbitrary rotations around the z-axis. It should be noted that due to the fixed center position of the spherical coordinates of the rotating LiDAR, applying translation errors along the x and y axes does not reflect the actual scenario. To ensure fairness and accuracy, arbitrary rotations around the z-axis were applied to the point cloud data before projection to generate the reflectance map and corresponding mapping. After generating the reflectance map, translation errors along the x and y axes were applied to the point cloud data.

The comparative methods are as follows:

Grid Cls.+PnP: The grid classification setup is a method proposed in DeepI2P (see the paper 'DeepI2P: Image-to-Point Cloud Registration via Deep Classification'). This method divides the image into 32×32 grids and uses a neural network to classify each 3D point into a unique 2D grid. EPnP with RANSAC is then applied to predict the rigid transformation.

Frus.Cls.+Inv.Proj.: DeepI2P proposes using inverse camera projection for frustum classification to obtain the final rigid transformation. This implementation reports results using both 2D and 3D inverse camera projections, referred to as DeepI2P(2D) and DeepI2P(3D), respectively.

CorrI2P: CorrI2P (see the paper 'CorrI2P: Deep Image-to-Point Cloud Registration via Dense Correspondence') is a method for image-to-point cloud registration. It learns dense correspondences between image-point cloud pairs and applies EPnP with RANSAC to predict the rigid transformation.

VP2P-Match: VP2P-Match (see the paper 'Differentiable Registration of Images and LiDAR Point Clouds with Voxel-Point-to-Pixel Matching') is an innovative framework that enhances pixel-to-point matching accuracy and speed by leveraging sparse convolution to increase the similarity between point cloud features and image features extracted by CNNs. Through end-to-end training, it integrates a differentiable PnP solver to learn structured cross-modal latent spaces for image-to-point cloud registration, achieving adaptive weighted optimization.

The testing metrics include relative translation error (RTE) $E_T$ and relative rotation error (RRE) $E_R$ to evaluate our registration performance. The calculations are as follows:

$$E_R = \sum_{i=1}^{3} |\gamma(i)|$$

$$E_T = \|T_{gt} - T_E\|$$

where γ is derived from the Euler angles of the rotation matrix obtained by multiplying the inverse of the ground truth rotation matrix $R_{gt}^{-1}$ with the predicted rotation matrix R. Similarly, the L2 norm of the difference between the ground truth translation matrix $T_{gt}$ and the predicted translation matrix $T_E$ gives $E_T$. The performance of the model is evaluated by the mean and standard deviation of RRE and RTE over the test set. This implementation follows the same evaluation method as VP2P-Match, with no data filtering for direct statistical analysis. Additionally, following VP2P-Match's evaluation methodology, this implementation also reports registration accuracy (Acc.), defined as the proportion of results with RTE <2m and RRE <5°. The final results are shown in Table 1:

TABLE 1

Registration Accuracy Results

| Method | RTE(m) ↓ | RRE(°) ↓ | Acc. ↑ |
|---|---|---|---|
| Grid Cls. + PnP | 3.64 ± 3.46 | 19.19 ± 28.96 | 11.22 |
| DeepI2P (3D) | 4.06 ± 3.54 | 24.73 ± 31.69 | 3.77 |
| DeepI2P (2D) | 3.59 ± 3.21 | 11.66 ± 18.16 | 25.95 |
| CorrI2P | 3.78 ± 65.16 | 5.89 ± 20.34 | 72.42 |
| VP2P-Match | 0.75 ± 1.13 | 3.29 ± 7.99 | 83.04 |
| Ours | 0.57 ± 1.16 | 3.16 ± 5.21 | 85.76 |

From Table 1, it can be observed that the method of this embodiment outperforms existing methods in both registration accuracy and success rate of precise registration.

Example 3

A computing device comprising a memory and a processor, where the memory stores a computer program, and the processor executes the computer program to implement the steps of the deep learning-assisted online calibration method based on reflectance map as described in Example 1 or 2.

Example 4

A computer-readable storage medium on which a computer program is stored, where the computer program is executed by a processor to implement the steps of the deep learning-assisted online calibration method based on reflectance map as described in Example 1 or 2.

Example 5

A LiDAR-camera online calibration system based on reflectance map, comprising:

Data Preprocessing Module: Configured to preprocess data to generate inputs suitable for the neural network part, including the reference image, reflectance map, and the projection mapping relationship between the point cloud and the reflectance map.

Matching Relationship Acquisition Module: Configured to input the preprocessed data into a trained neural network; the neural network outputs edge point features of the reference image and reflectance map, i.e., descriptors of the reference image and reflectance map. By comparing the similarity of the descriptors of the reference image and the reflectance map, the matching relationship between the reference image features and the reflectance map features is found. Using the mapping relationship between the reflectance map and the 3D point cloud, the matching relationship between the reference image and the point cloud is found.

Calibration Implementation Module: Configured to estimate the transformation matrix from the given 2D-3D point pairs using the EPnP algorithm, completing the calibration process.

What is claimed is:

1. A method for online LiDAR-camera calibration based on reflectance maps, comprising a non-transitory computer readable medium operable on a computer with memory for the method for the online LiDAR-camera calibration, and comprising program instructions for executing the following steps of:

data preprocessing to generate data suitable for neural network input, including a reference image, a reflectance map, and the projection mapping relationship between the point cloud and the reflectance map;

inputting the preprocessed data into a trained neural network, which outputs the edge point features of the reference image and the reflectance map, i.e., the descriptors of the reference image and the reflectance map; by comparing the similarity of the descriptors, the matching relationship between the features of the reference image and the reflectance map is found;

using the mapping relationship between the reflectance map and the 3D point cloud to find the matching relationship between the reference image and the point cloud;

using the EPnP (Efficient Perspective-n-Point Camera Pose Estimation) algorithm to estimate the transformation matrix from the given 2D-3D point pairs to complete the calibration process;

the input data suitable for a neural network includes the reference image, the reflectance map projected based on a laser projection, and the projection mapping relationship between the LiDAR point cloud and the reflectance map during the projection process; the reference image is obtained by adjusting the camera-captured image to a specified size, the reflectance map is obtained by projecting the LiDAR point cloud through th laser projection, and the projection mapping relationship between the LiDAR point cloud and the reflectance map is generated during the projection process by creating a mapping matrix; wherein the neural network comprises an image feature extraction network and a matching optimization network; extracting the feature information on the edge points of the reference image and the reflectance map through two image feature extraction networks, inputting them into the matching optimization network, and finding the optimal 2D-2D matching point pairs by the similarity of the descriptors of the reference image and the reflectance map;

using a laser projection method to project the reflectance of the point cloud to obtain the reflectance map, including:

converting the coordinates of the point cloud using spherical projection principles, converting the point cloud from Cartesian coordinates to spherical coordinates;

obtaining the laser projection of the point cloud;

generating the projection image and recording the mapping; while generating the reflectance map, recording a mapping matrix between the 3D point cloud and the reflectance map, which generates a matrix with the same number of rows and columns as the reflectance map; the value of the matrix corresponds to the index of the points in the original point cloud that fall on the pixels of the reflectance map during the projection;

obtaining the preprocessed grayscale image, including:

adjusting the camera image to the same size, and obtaining the adjusted grayscale image through preprocessing, which, together with the reflectance map obtained from the point cloud projection, is input into the neural network;

extracting edge points of the image before extracting features using the image feature extraction network, including:

using the Sobel edge detection method to extract edge points of the reflectance map; decomposing the reflectance map using wavelet transform to obtain low-frequency and high-frequency coefficients, filtering out high-frequency noise to restore the reflectance map, achieving a wavelet-denoised enhanced image; this operation is wavelet filtering; after wavelet filtering, using the Sobel operator to extract edge points of the reflectance map;

using the Sobel operator to extract edge points of the reference image;

extracting image features using a residual network that consists of 34 convolutional layers;

the residual network includes a residual network encoder and a residual network decoder; inputting the obtained reference image and reflectance map into the residual network encoder to generate global features of the reference image and the reflectance map;

inputting the global features of the reference image into the residual network decoder to output the image features of the reference image; inputting the global features of the reflectance map into the residual network decoder to output the image features of the reflectance map;

concatenating the image features of the reference image and the global features of the reflectance map to generate concatenated features of the reference image; concatenating the image features of the reflectance map and the global features of the reference image to generate concatenated features of the reflectance map;

aggregating the concatenated features of the reference image to the extracted edge points of the reference image, and obtaining the edge point features of the reference image through bilinear interpolation; aggregating the concatenated features of the reflectance map to the extracted edge points of the reflectance map, and obtaining the edge point features of the reflectance map through bilinear interpolation; and improving calibration accuracy and computational efficiency, reducing cross-modality differences for autonomous vehicles based on results of the method for the online LiDAR-camera calibration.

2. The online LiDAR-camera calibration method based on reflectance maps according to claim 1, characterized in that inputting the feature information into the matching optimization network, finding the optimal 2D-2D matching point pairs by the similarity of the descriptors of the reference image and the reflectance map, including:

the edge point features of the reference image and the reflectance map pass through a linear layer first, then obtain a similarity matrix S through matrix multiplication; the similarity matrix S undergoes Softmax calculations twice on the rows and columns, respectively; after the calculations, the two resulting matrices undergo Hadamard product to obtain a new matrix after Softmax processing; meanwhile, the edge point features of the reference image obtain the reference image matching score $\sigma_R$ through a linear layer and Sigmoid activation function; the edge point features of the reflectance map obtain the reflectance map matching score $\sigma_I$ through a linear layer and Sigmoid activation function; the reference image matching score $\sigma_R$ and the reflectance map matching score $\sigma_I$ are multiplied through matrix multiplication, and then undergo Hadamard product with the new matrix after Softmax processing to obtain the partial assignment matrix P;

for the partial assignment matrix P, finding the maximum value of each row and recording it; if the column coordinate of these maximum values is also the maximum value of its column, the corresponding 2D points at that position are considered as an optimal 2D-2D matching point pair.

3. The online LiDAR-camera calibration method based on reflectance maps according to claim 2, characterized in that the overall loss function L of the neural network is:

$$L=L_\sigma+L_P;$$

after projecting the 3D point cloud to the 2D image plane, setting a circular radius threshold $\epsilon_c$; if the Euclidean distance between the projection point of a 3D feature point and a certain 2D feature point is less than $\epsilon_c$, it is considered as an actual 2D-3D matching point pair; after obtaining the matching point pairs, recording the situation of whether the 2D and 3D points are matching points $\sigma_{R_{GT}}$ and $\sigma_{I_{GT}}$; calculating the matching scores $\sigma_R$ and $\sigma_I$ and the binary cross-entropy loss functions of the actual matching, obtaining $L_{\sigma1}$ and $L_{\sigma2}$, $$L_{\sigma1} = -\left(\sigma_{R_{GT}} \cdot \log(\sigma_R) + \left(1 - \sigma_{R_{GT}}\right) \cdot \log(1 - \sigma_R)\right),$$
$$L_{\sigma2} = -\left(\sigma_{I_{GT}} \cdot \log(\sigma_I) + \left(1 - \sigma_{I_{GT}}\right) \cdot \log(1 - \sigma_I)\right)$$
$$L_\sigma = L_{\sigma1} + L_{\sigma2};$$
$$L_P = -\frac{1}{M} \sum_{(i,j) \in M} \log P_{ij}$$

here, M represents the positions of the actual matching point pairs, and $P_{ij}$ is the value in the i-th row and j-th column of the partial assignment matrix P (i,j) are the point pairs in the actual matching set M, where i is the index of the feature point in the reference image and j is the index of the corresponding feature point in the reflectance map.

4. The online LiDAR-camera calibration method based on reflectance maps according to claim 1, characterized in that using the mapping relationship between the reflectance map and the 3D point cloud to find the matching relationship between the reference image and the point cloud, including:

while projecting the reflectance of the point cloud to obtain the reflectance map, also recording the mapping matrix between the 3D point cloud and the reflectance map; through this mapping matrix, finding the 3D points in the original point cloud corresponding to the edge points of the reflectance map in the 2D-2D matching point pairs obtained from a partial assignment matrix P, thus converting the 2D-2D matching relationship into a 2D-3D matching relationship.

5. The online LiDAR-camera calibration method based on reflectance maps according to claim 1, characterized in that using the EPnP algorithm to estimate the transformation matrix from the given 2D-3D point pairs to complete the calibration process, including:

after obtaining the 2D-3D matching relationship pairs, using the EPnP algorithm with RANSAC to estimate the camera pose, including the rotation matrix R and the translation matrix T, to complete the calibration process.

* * * * *